United States Patent
Yin et al.

(10) Patent No.: US 7,930,198 B2
(45) Date of Patent: Apr. 19, 2011

(54) MAINTENANCE EVENT PLANNING AND SCHEDULING FOR GAS TURBINES

(75) Inventors: Watao Yin, New York, NY (US); Amit Chakraborty, Cranbury, NJ (US)

(73) Assignee: Siemens Corporation, Iselin, NJ (US)

( * ) Notice: Subject to any disclaimer, the term of this patent is extended or adjusted under 35 U.S.C. 154(b) by 1536 days.

(21) Appl. No.: 11/232,774

(22) Filed: Sep. 22, 2005

(65) Prior Publication Data

US 2006/0253311 A1    Nov. 9, 2006

Related U.S. Application Data (60) Provisional application No. 60/678,982, filed on May 9, 2005.

(51) Int. Cl.
*G06Q 10/00* (2006.01)
(52) U.S. Cl. .................................. 705/7.12
(58) Field of Classification Search ............... 705/8
See application file for complete search history.

(56) References Cited

U.S. PATENT DOCUMENTS

| | | | | |
|---|---|---|---|---|
| 6,044,361 | A * | 3/2000 | Kalagnanam et al. | 705/28 |
| 2004/0024686 | A1 * | 2/2004 | Sandholm et al. | 705/37 |

OTHER PUBLICATIONS

Perregaard, Michael; Clausen, Jens. "Parallel Branch-and-Bound Methods for the Job-Shop Scheduling Problem". Jun. 29, 1998.*

Zivan Roie; Meisels, Amnon. "Conflict Based Backjumping for Constraints Optimization Problems".*

Franck, Birger; Neumann, Klaus; Schwindt, Christoph. "Truncated branch-and-bound, schedule-construction, and schedule-improvement procedures for resource-constrained project scheduling". 2001. OR Spektrum.*

Dell'Amico, Mauro; Iori, Manuel; Martello, Silvano. "Heuristic Algorithms and Scatter Search for the Cardinality Constrained P||Cmax Problem". 2004. Journal of Heuristics. Issue 10. pp. 169-204.*

Demeulemmester, Erik L; Herroeln, Willy S. "A Branch-and-Bound Procedure for the Generalized Resource-Constrained Project Scheduling Problem". Mar.-Apr. 1997. Operations Research. vol. 45, Issue 2. pp. 201-212.*

Cao, B. "Transportation Problem with Nonlinear Side Constraints a Branch and Bound Approach". 1992. Methods and Models of Operations Research. vol. 36. pp. 185-197.*

Kramer, Andreas. "Branch and Bound Methods for Scheduling Problems with Multiprocessor Tasks on Dedicated Processors". 1997. OR Spektrum. Issue 18. pp. 219-227.*

Yamashita, Denise Sato.; Armentano, Vinicius Amaral; Laguna, Manuel. "Scatter Search for Project Scheduling With Resource Availability Cost". Mar. 13, 2004.*

"Project Scheduling with Time Windows and Scarce Resources", Neumann et al., Second Edition, Springer, 2003, pp. 34-39, 56-57 and 282-283.

"Scheduling Project Networks with Resource Constraints and Time Windows", Bartusch et al., Annals of Operations Research, 16, (1988), pp. 201-240.

"A Branch-and-bound Procedure for the Resource-Constrained Project Scheduling Problem With Generalized Precedence Relations", De Reyck et al., European Journal of Operational Research 111 (1988), pp. 152-174.

"A Hybrid Scatter Search/Electromagnetism Meta-Heuristic for Project Scheduling", Debels et al., European Journal of Operational Research (2004).

* cited by examiner

*Primary Examiner* — Peter Choi (57) ABSTRACT

A method for scheduling a project such as the inspection and maintenance of a gas turbine utilizes a branch and bound technique for arriving at a solution. The branch and bound technique is improved by using an all-pair longest path algorithm in preprocessing to tighten the set of possible start times of the tasks. That set is further tightened by considering two-forbidden-task pairs; i.e., pairs of tasks that cannot execute at the same time due to conflicting resource needs. A hard lower bound of a branch is determined by using all-pair longest path update and two-forbidden-task pair update, reducing the need to recalculate.

10 Claims, 7 Drawing Sheets

FIG. 7

MAINTENANCE EVENT PLANNING AND SCHEDULING FOR GAS TURBINES

CLAIM OF PRIORITY

This application claims priority to, and incorporates by reference herein in its entirety, U.S. Provisional Patent Application Ser. No. 60/678,982, filed May 9, 2005, and entitled "Maintenance Event Planning and Scheduling for Gas Turbines."

FIELD OF THE INVENTION

The present invention relates generally to the field of project management. More specifically, the invention relates to the planning and scheduling of projects having "non-regular" objectives and limited resources, such as gas turbine maintenance projects.

BACKGROUND OF THE INVENTION

A "project," as that term is used herein, includes many individual activities, each of which requires certain amount of time and resources to be completed. Project scheduling is the problem of finding the starting times and the execution modes of the activities such that the prescribed constraints on resources and the prescribed relations between activities are satisfied and an objective function is optimized.

In a project scheduling problem, a set of activities and a project deadline in form of time are given. All activities should be finished before the deadline. A set of resources that are required by the execution of activities is given. The execution of each activity requires time and resources, and the starting and finishing times are subject to constraints such as precedence relations and temporal relations to the times of the other activities.

With each activity, one or a set of execution modes is given. Each execution mode specifies a profile of the execution of the activity that contains durations, certain resources and their amount, and the resulting profit. Resources can be of different types. Renewable resources are assumed to have constant availability during the whole project period. Each activity may occupy a certain amount of renewable resources during its execution. The total amount of each renewable resource, however, is typically limited. Therefore, certain sets of activities that together require more than available renewable resources cannot be executed simultaneously.

Some examples of renewable resources are human specialists and tools. Nonrenewable resource, like materials and combustibles, are depleted after being used for performing activities. The total availability of each nonrenewable resource is given as constraints. Other types of resources may also be present.

In addition to being subject to resource availability, the execution of activities is also subject to the prescribed precedence or temporal constraints mentioned above. The precedence constraints are in the form of pair-wise orders between the starts and finishes of activities (e.g., Activity B must start after Activity A is finished). The temporal constraints generalize the precedence constraints by introducing specific time or length of time to the precedence relations. A temporal constraint between events A and B should specify the minimum or the maximum delay between events A and B.

A feasible solution of the project scheduling problem includes the starting times of all activities and their execution modes such that all constraints and the deadline are met. There may or may not exist any feasible solution, and there may exist more than one feasible solution. A given objective function measures the quality of a solution. An objective function may be a combination of multiple sub-objectives which often conflict with one another (e.g., minimizing the resource usage while also minimizing the project duration). The project scheduling problem is to find a feasible solution such that the given objective function is optimized (mathematically, either minimized or maximized).

Several factors have been found by the inventors to be important to project execution of the type discussed herein and may significantly affect the total project cost. Each of the following factors is discussed in more detail below:

1. While the starts and finishes of individual activities may have a certain level of flexibility, the entire project must be finished before a given deadline. Violating that deadline may incur high penalty.

2. Resource (personnel, tools, materials, and etc.) costs are the dominant portion of project expenses.

3. The amount of certain resources is not linearly related to the amount of work. Those resources may be shared by the multiple activities that are executed simultaneously.

4. Activities may be executed in multiple modes. Those are often the tradeoffs among duration and different resources.

5. Sequence-dependent activity setup time and costs can be significant.

6. The relations between activities are sometimes better characterized by temporal constraints than precedence constraints.

7. Different objectives, which may conflict with each other, are present. All of the objectives should be considered in a balanced way.

Factors 1 and 2 are dealt with in most existing techniques for optimizing project schedules. There is, however, presently a need for an integrated model that considers all the factors so that the solution is optimized more accurately. While formulation of such an integrated model has been attempted in the past, such attempts have failed because of the lack of mathematical modeling techniques and the limited computational powers to solve problems in a real-world size. Those difficulties are integrated, because better modeling gives more efficient algorithms and, thus, problems of larger size can be numerically solved.

The third factor listed above relates to resource sharing. Resource sharing is rarely considered in the literature and in most existing software; however, it happens very often in the real world. For example, carpooling and room sharing are instances of resource sharing. Resource sharing exhibits a nonlinear relation between the required amount of resources and the amount of work they serve because the same resource might be used and shared by multiple activities that are executed simultaneously and near the same location. While individual activities should be scheduled at their best times, a trade-off of individual best timing to increased sharing of resources may lower the overall cost. There is a need for a model wherein that trade-off is considered and balanced with other objectives.

The fourth factor above considers multiple execution modes. Activities can be performed in different modes. Each mode of an activity is associated with a profile, which specifies the activity duration, the consumption of resources, quality, and profits. Typical multiple modes are the trade-offs between time and resources, time and quality, and even between different resources.

The fifth factor above relates to sequence-dependent setup time/costs. That concept was originally associated with single-machine production scheduling. The inventors have generalized it and associated it with the concept of personnel traveling and resource transportation. Traveling and resource transportation often incur large expenses in on-site service projects. When a group of specialists, together with the tools, materials, and combustibles, are involved in serving at sites all over a nation or even the world, the traveling and transportation time and costs can be significant. The coding of start/finish event orders (described below) fundamentally enables the sequence-dependent setup time and costs to be easily evaluated and optimized as one of the objectives.

The sixth factor takes into account temporal constraints. The relationships between the activities in certain time sensitive real-world applications must be presented by the temporal constraints, instead of the simpler precedence constraints. The temporal constraints generalize the traditional precedence constraints. Older project scheduling models only allow users to specify precedence constraints and will return schedules in which the starts of the activities satisfy the prescribed precedence. On one hand, in time-critical industries such as chemical engineering and food processing, certain activities must be done within given time frames, not too early after their preceding activities are finished and not too late after either. Temporal constraints model that by specifying the minimum and maximum delays between activities. On the other hand, in most industries, storing products between processes also incurs costs, which are omitted in older scheduling techniques. The storage of products for further processes may be modeled as activities that start immediately after the preceding process finishes and end immediately before the succeeding process begins and has varying durations (i.e., multi modes).

The seventh factor relates to the plural objectives of the project. Most project scheduling models in the literature and most commercial scheduling software only minimize project makespans. In other words, they optimize worst-case task durations. While minimizing makespan is an important purpose of traditional production scheduling, it is not the only one. For example, in service event scheduling, the service events are usually roughly scheduled so the main means of optimally scheduling the activities of services and determining their execution modes is to evenly schedule the utilization of rare and expensive resources. A lot of real world objectives are "non-regular;" i.e., generally speaking, the objective may not be improved by scheduling activities earlier. Consequently, scheduling problems with non-regular objectives are considered harder than those with regular objectives. Some examples of regular objectives are: the minimization of makespan, weighted delays, the total number of tardy activities, and/or the total (weighted) resource consumption as well as any combination of "regular" objectives. In contrast, "non-regular" objectives include the minimization of renewable resource leveling, setup time/cost, earliness, the total number of early activities and/or the maximization of net present value as well as the optimization of any combination of "regular" and "non-regular" objectives.

There is therefore presently a need to provide a model that consolidates at least some of those concepts into an integrated problem and a technique that solves the problem. Particularly, there is a need for a technique for efficiently solving a scheduling network in a project having a small to medium number of tasks and expensive resources that must be shared among tasks. To the inventors' knowledge, no such techniques are currently available.

SUMMARY OF THE INVENTION

The present invention addresses the needs described above by providing a method for scheduling a group of events in a project, the events having interrelated temporal and resource requirements. Initially, information is loaded regarding the temporal and resource requirements of the events to create a search space S. The search space S is then preprocessed, including reducing the search space S using an all-pair longest path technique. Finally, a branch and bound technique is applied to the preprocessed search space S to find an optimal schedule or report project infeasibility.

The method may also include the step of picking an upper bound UB of the search space S, in which case the branch and bound technique includes the steps of picking a partial schedule b from the search space S, computing a hard lower bound HLB of the partial schedule b using an all-pair longest path update, and comparing the HLB with the UB.

The preprocessing step may further include reducing the search space using a 2-forbidden task pair technique. In that case, the overall method may further comprise the step of picking an upper bound UB of the search space S, in which case the branch and bound technique includes the steps of picking a partial schedule b from the search space S, computing a hard lower bound HLB of the partial schedule b using a 2-forbidden task pair update, and comparing the HLB with the UB.

The preprocessing step may further include the steps of generating a start schedule, setting an upper bound of the start schedule, setting a bookkeeping set from the starting schedule, and setting a search queue. The branch and bound technique in that case may further include the step of conducting a scatter search in the search space S to reorder the search queue.

The searching performed in the branch and bound technique may comprise performing a scatter search.

In another embodiment of the invention, a method is provided for scheduling a group of events in a project, the events having interrelated temporal and resource requirements. The method comprises the steps of loading information regarding the temporal and resource requirements of the events to create a search space S, preprocessing the search space S, including reducing the search space S using a 2-forbidden task pair technique, and applying a branch and bound technique to the preprocessed search space S to find an optimal schedule.

That method may further include the step of picking an upper bound (UB) of the search space S; in which case the branch and bound technique includes the steps of picking a partial schedule b from the search space S, computing a hard lower bound (HLB) of the partial schedule b using a 2-forbidden task pair update, and comparing the HLB with the UB.

In another embodiment of the invention, computer program product is provided. The computer program product comprises a computer readable recording medium having recorded thereon a computer program comprising code means for, when executed on a computer, instructing said computer to control steps in the above-described methods.

Another embodiment of the invention is a method for scheduling a group of tasks in a project, the tasks having interrelated temporal and resource requirements, the tasks comprising a search space S. The method includes the step of applying a branch and bound technique to the search space S to find an optimal schedule. The branch and bound technique includes picking a partial schedule b from the search space S, deriving a non-floating time period during which each unscheduled task in b must be undergone, and a floating time period during which the task is undergone only for certain start times, distributing resource usages of the unscheduled tasks during the floating times such that total resource cost is minimized, and setting a resulting schedule as a hard lower bound (HLB). The method may further include the steps of picking an upper bound UB of the search space S, and comparing the HLB with the UB.

DESCRIPTION OF THE INVENTION

Figure 1:
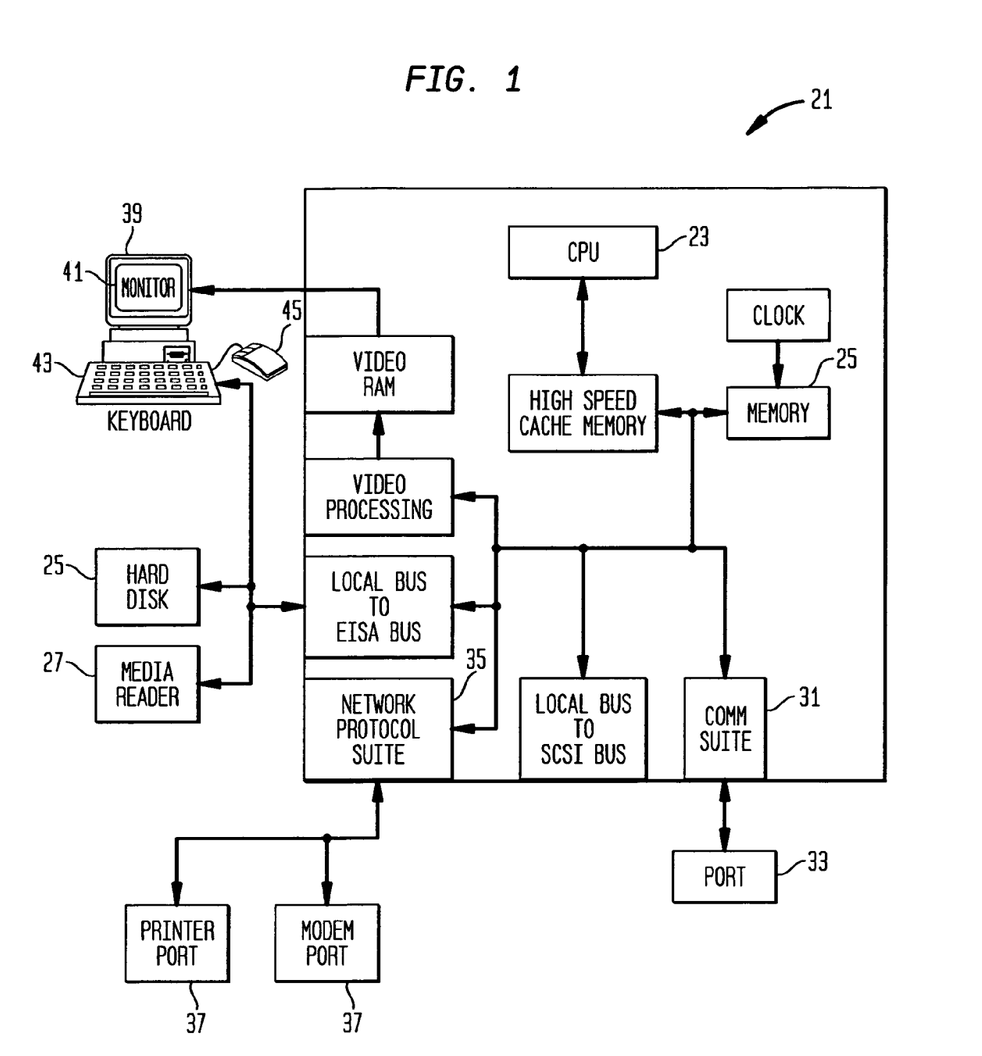
FIG. 1 is a schematic diagram showing a computer for executing instructions of an embodiment of the invention.

An embodiment of a computer 21 executing the instructions of an embodiment of the invention is shown in FIG. 1. A representative hardware environment is depicted which illustrates a typical hardware configuration of a computer. The computer 21 includes a CPU 23, memory 25, a reader 27 for reading computer executable instructions on computer readable media, a common communication bus 29, a communication suite 31 with external ports 33, a network protocol suite 35 with external ports 37 and a GUI 39.

The communication bus 29 allows bi-directional communication between the components of the computer 21. The communication suite 31 and external ports 33 allow bi-directional communication between the computer 21, other computers 21, and external compatible devices such as laptop computers and the like using communication protocols such as IEEE 1394 (FireWire or i.LINK), IEEE 802.3 (Ethernet), RS (Recommended Standard) 232, 422, 423, USB (Universal Serial Bus) and others.

The network protocol suite 35 and external ports 37 allow for the physical network connection and collection of protocols when communicating over a network. Protocols such as TCP/IP (Transmission Control Protocol/Internet Protocol) suite, IPX/SPX (Internetwork Packet eXchange/Sequential Packet exchange), SNA (Systems Network Architecture), and others. The TCP/IP suite includes IP (Internet Protocol), TCP (Transmission Control Protocol), ARP (Address Resolution Protocol), and HTTP (Hypertext Transfer Protocol). Each protocol within a network protocol suite has a specific function to support communication between computers coupled to a network. The GUI 39 includes a graphics display such as a CRT, fixed-pixel display or others 41, a key pad, keyboard or touchscreen 43 and pointing device 45 such as a mouse, trackball, optical pen or others to provide an easy-to-use, user interface for the invention.

The computer 21 can be a handheld device such as an Internet appliance, PDA (Personal Digital Assistant), Blackberry device or conventional personal computer such as a PC, Macintosh, or UNIX based workstation running their appropriate OS (Operating System) capable of communicating with a computer over wireline (guided) or wireless (unguided) communications media. The CPU 23 executes compatible instructions or software stored in the memory 25. Those skilled in the art will appreciate that the invention may also be practiced on platforms and operating systems other than those mentioned.

In the present disclosure, two approaches are discussed for addressing the above factors. In a first approach, a branch and bound technique is presented. the branch and bound approach effectively addresses at least the first, second, sixth and seventh factors above, while yielding exact results (because it uses an exact algorithm). The second described approach is a genetic algorithm-based method, and addresses all of the above factors using an approximate algorithm.

Branch and Bound Technique

One project scheduling technique applied by the inventors for scheduling maintenance of large turbines at customers' facilities is the branch and bound technique. In turbine maintenance, each service event, especially major inspection, includes many tasks and requires a large set of different resources and the collaboration of many technicians. The inventors have adapted the known branch and bound technique to model the events, material and human resources, and related constraints as a mathematical program and to solve the program to give the optimal schedules of events and the optimal assignment of resources.

Maintenance event planning and scheduling for gas turbines falls in the category of resource-constrained project scheduling problems (RCPSP), which considers a batch production where activities require scarce resources to perform. There are several resources necessary, both renewable and non-renewable, to execute a turbine maintenance plan. The inventors have formulated the optimization problem as an integer program.

The integer program with the listed extensions can be solved by general integer programming codes; however, to exploit the structure in scheduling problems, special heuristics have been developed. Two categories of these heuristics, the exact algorithms and the approximate algorithms, were considered in selecting this solution. To exactly and efficiently solve the problem, a special branch and bound algorithm was developed based on a general purpose branch and bound algorithm.

The events (or activities) involved in scheduling maintenance for gas turbines have large profiles and are subject to limited numbers of personnel, tools and other resources. The types of maintenance contracts that must be scheduled include major inspection, minor inspection, hot gas path inspection, repair and refurbishment. A major inspection might be a turnkey inspection that is done at outage speed, or alternatively done at normal speed. A turnkey inspection done at outage speed, for example, might require the performance of 130 tasks, involving personnel with 30 different functions, about 35 tools, several consumable resources and some local subcontracting.

Initially, the problem is analyzed as a general project problem. In general, a project consists two parts: the planning part and the scheduling part. The problem is subject to limited or scarce resources, the limitations including renewable, non-renewable, double-constrained, cumulative, synchronizing and spatial. The problem is further subject to task precedence and temporal constraints, possibly with multiple execution modes of the tasks and with different or conflicting business objectives, such as time-based objectives and financial objectives.

Between planning and scheduling, planning is more application-dependent. Planning specifies which activities and tasks must be finished. In the present turbine maintenance example, the activities are individual maintenance events.

Moreover, planning describes the restrictions on implementing the project. Those restrictions may have a broad range and many forms. For example, the following are often considered in practice: release times and due times of activities; estimated durations of activities; availability of resources needed by events in the project; and inter-dependencies between tasks, resources and time. Service planning in the short range is a planning of personnel, materials and equipment resources to meet the volume and due dates imposed by the customer.

Instead of a fixed duration, an activity may have variable duration. In that case, the prescribed restrictions could be minimum duration and maximum duration. Resources can also have multiple forms, such as human resources (operators, specialists, etc.), machines, tools, capital, consumables, and time. Although time is a resource, it is usually treated in a special way because it is only partially renewable and is the core of a schedule.

In the present gas turbine maintenance example, human resources including the specialists with different functions, various tools and machines are considered renewable resources, and gas and other liquid are non-renewable resources. To understand time as a limited resource, consider the maintenance activities that must be finished during previously prescribed turbine offline periods. As mentioned, inter-dependency rules are also given in the plan. Those rules combine the restrictions on individual resources and make the situation complicated.

In contrast to planning, scheduling defines when and how the tasks are to be done. Traditional algorithms consider only scheduling. Tasks are given temporal assignments to establish when they will be done, and are assigned execution orders and modes, personnel and resources to establish how they will be done. A set of objectives is used to measure performance of the schedule and/or the feasibility of the plan.

Planning and scheduling are often inseparably connected. Both the plan and the objectives determine the difficulty of finding a feasible or optimal schedule. To consider both the planning and the scheduling aspects of a project, the technique developed by the inventors relaxes the temporal and resource constraints, and assigns prices/penalties to them, and allows multiple execution modes for the tasks.

Figure 3:
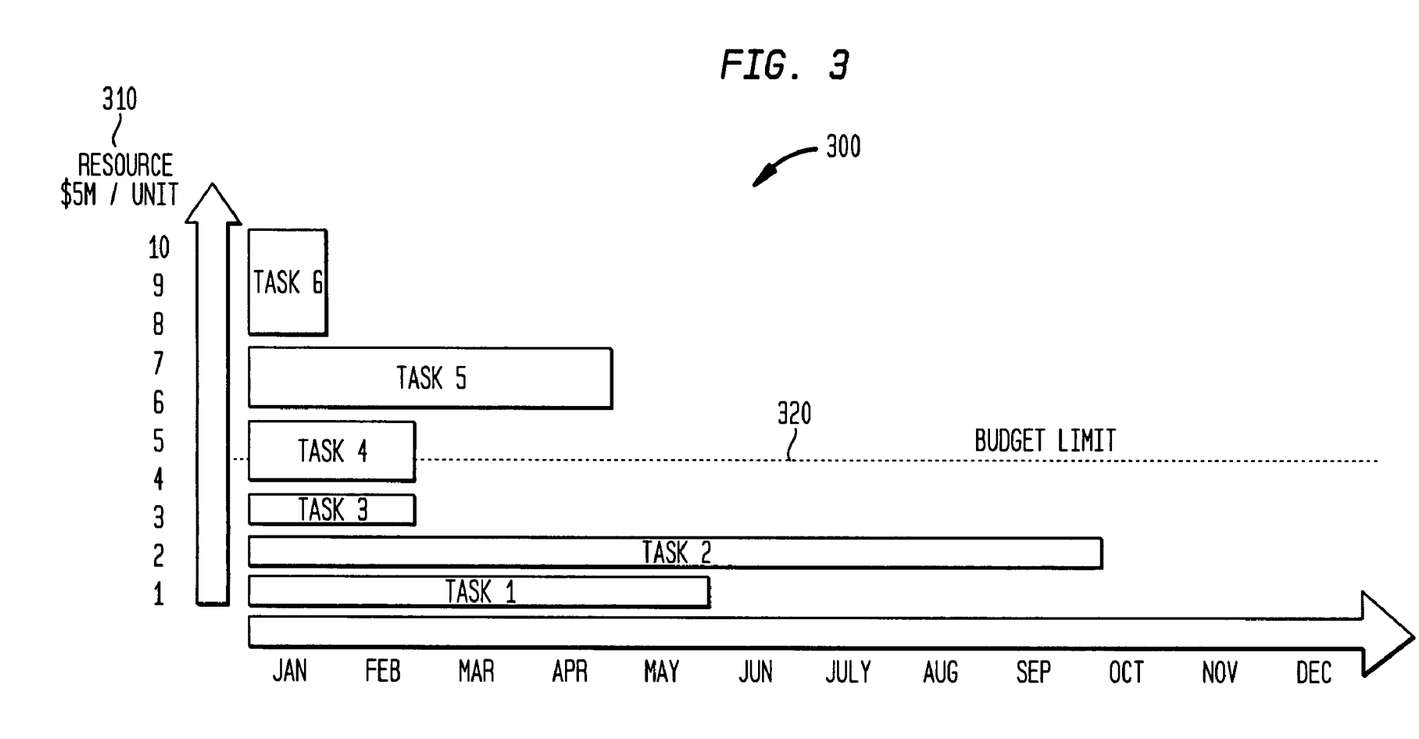
FIG. 3 is a diagram showing example tasks to be scheduled.

A simple scheduling problem example is presented with reference to FIGS. 3-6. As shown in FIG. 3, the project 300 has one type of resource 310 costing $5 million per unit. The project is constrained to a budget limit 320 of $20 million (4 resource units). Six tasks (task 1-task 6) must be completed, each with a fixed duration and a fixed number of units of the only resource. The total project duration is limited to 12 months.

Figure 4:
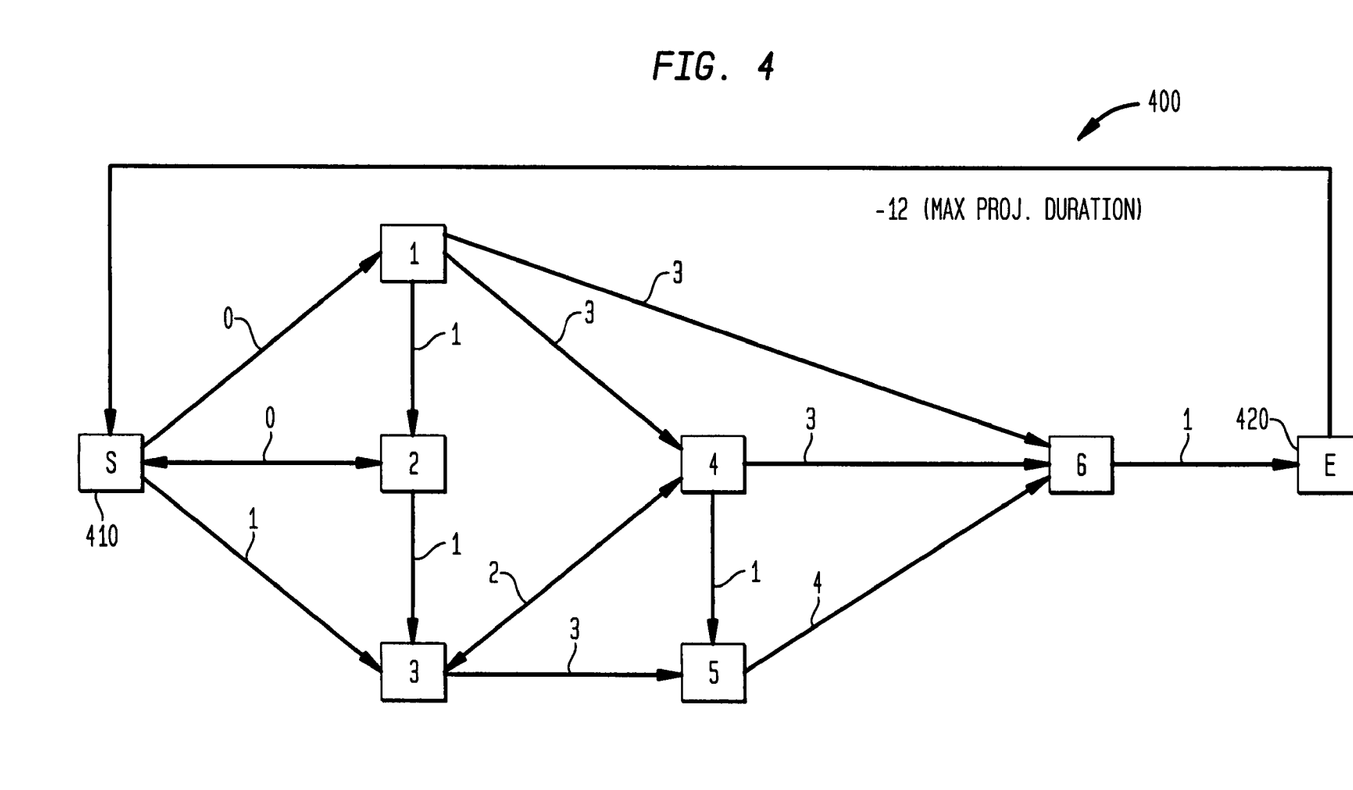
FIG. 4 is a network diagram showing temporal relationships among the tasks of FIG. 3.

In FIG. 4, the temporal inter-dependencies between the tasks are presented on a network 400 called an "activity-on-node" network, in which nodes "S" and "E" are the start 410 and the end 420 of project, respectively. Some pairs of nodes are connected by directed arcs, each with a weight which specifies the minimal delay between the start of the tail activity and the start of the head activity. For example, arc (3, 5) which connects node 3 and node 5 has a weight of 3. That means that activity 5 must start 3 months or longer after activity 3 starts.

Figure 5:
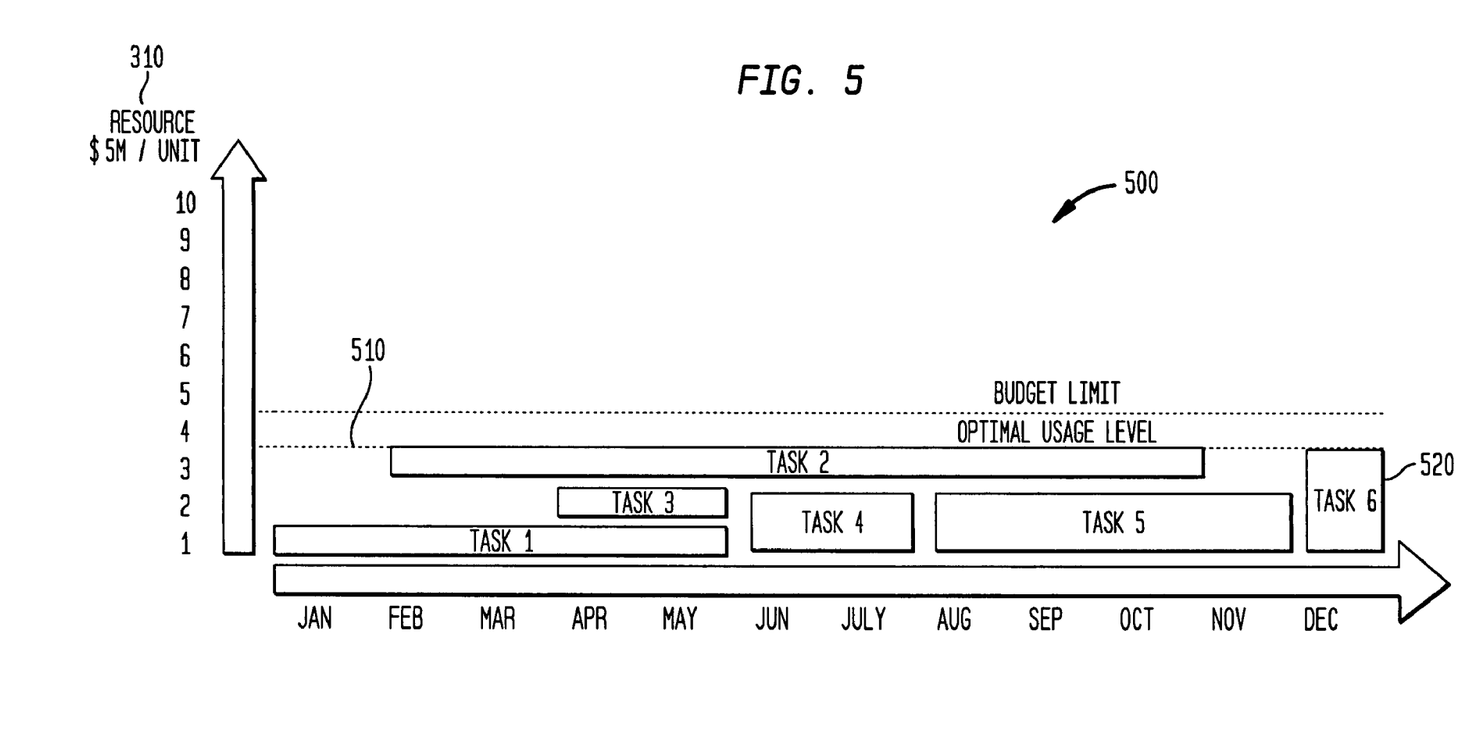
FIG. 5 is a diagram showing a schedule of the tasks of FIG. 3.
Figure 6:
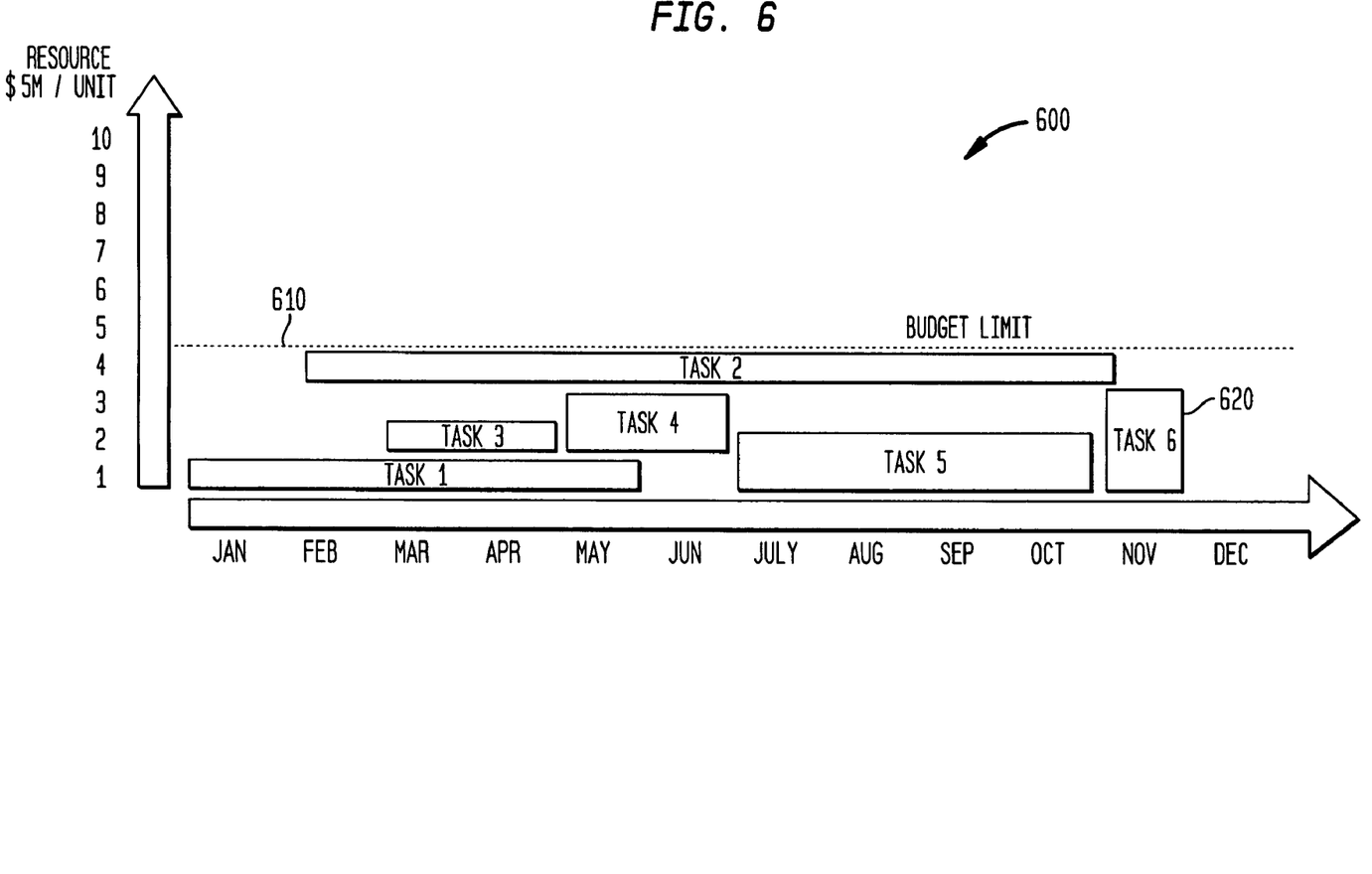
FIG. 6 is a diagram showing another schedule of the tasks of FIG. 3.

FIGS. 5 and 6 together present the project plans; i.e., the set of activities and restrictions. FIGS. 5 and 6 present two different optimal (feasible) schedules under two different objectives. A solution 500 minimizing the resource leveling (i.e., minimizing the total purchase of resource) is shown in FIG. 5. That solution requires three units 510 of the resource and has a project duration 520 of twelve months.

A solution 600 of minimizing the project duration (also called makespan) is shown in FIG. 6. That solution requires four units 610 of the resource, but has a 1-month shorter project duration 620 of eleven months.

To formally define the gas turbine maintenance scheduling problem, unified terms are used, including "activity," "resource," "precedence," "time," "duration," "cost," "preemption," "constraints," and "objectives." As inputs to the method of the invention, the following are given: a set of activities that must be executed; a set of activities that may be executed with some probabilities; precedence rules on the activities; a set of limited resources, each with a price model; a set of unlimited resources, each with a price model; resource availabilities (in quantity, time and duration); resource inter-dependencies (in quantity, time and duration); preemption rules and an overall objective (measure) with which to judge a schedule's performance.

As outputs, one or more questions should be answered by execution of the technique. For example, what is the best way to execute activities in specific modes at specific times? Which resources should be assigned to activities in what quantities and at what times, such that all constraints (plan requirements) are satisfied and the best overall objective value is achieved? In sum, an objective is minimized, subject to constraints.

The activities or tasks have several properties of interest. For example, different manners of execution or modes require different resources and have different temporal effects. An activity or task may have separate and possibly divisible parts. Tasks may be interrupted and resumed. They may have precedence relations within the network. The activities or tasks may use resources in constant or variable amounts for the duration.

The tasks or activities furthermore have measurable estimates of performance criteria, according to the plan. Those criteria may include time/duration, resource consumption, quality, customer satisfaction and total cost.

Resources, as defined herein, may be renewable or non-renewable. Renewable resources include labor and most tools. Non-renewable resources become unavailable after they are used.

Resources may vary in capability, cost and other performance measures. For example, some tools are more useful than others; certified professionals work more efficiently than others; a delivery may have an associated likelihood of being on time.

Resources may furthermore vary in availability. Professionals may have work shifts and vacations; some machines may run only during the daytime while others run 24 hours per day.

The inventors have identified several resource types in the problem. Renewable resources include equipment and manpower. Non-renewable resources include money and energy. A double-constrained resource is limited by more than one factor; for example, money with restricted cash flow per period is double-constrained. A cumulative resource is inventory that is generally depleted and replenished over time. For example, a stock-keeping facility may have a minimum and maximum inventory.

A synchronizing resource requires that all activities in a batch must be started at the same time. For example, furnaces and autoclaves are synchronizing resources. Spatial resources may be shared by task families. Those resources are occupied from the start of the first task up to the completion of the last task of a task family. As noted above, time is a special resource that is partially renewable.

Constraints and objectives are related but separate elements in the problem. Constraints define the feasibility of a schedule, while objectives define the optimality of a schedule. Only relationships that must be satisfied are constraints.

Objectives, on the other hand, may conflict, and are handled using an objective balancing mechanism.

Constraints have many forms. Those include precedence constraints, temporal constraints and resource constraints. Over-tight constraints often result in no feasible schedules. Defining constraints and objectives is critical in applications.

No schedule is static until the project is completed; instead, any project is subject to dynamic variations. For example, job arrivals may be uncertain, planning may be inaccurate, resources may be unexpectedly delayed or unavailable, and objectives may change. The inventors address that fact by maintaining the consistency of the optimization given a partial schedule. The existing schedule is used as a constraint by freezing part of the existing schedule and optimizing the rest. Often of particular interest is minimizing weighted earliness and tardiness.

Ideally, to deal with dynamic variations, the algorithms used in the invention are capable of hot start. In that way, it is possible to start from the previously optimal solution, which is no long feasible or optimal, after a small change is applied to the parameters.

The following is a math formulation of the problem, in a form for better considering the particularities of a gas turbine maintenance project:

Consider a project set J with J tasks $\{1, \ldots, J\}$.

Add dummy start and end tasks 0 and J+1.

Each task has a duration $p_j$. $p_0 = p_{J+1} = 0$.

A task starts at $S_j$. $S_0 = 0$, $S_{J+1}$=project duration.

The project has temporal constraints. Two tasks i, j: $S_j = S_i + d_{ij}$. $d_{ij}$ may have both lower and upper bounds. For example, task 5 cannot be started before task 3 is finished $\rightarrow S_5 \geq S_3 + p_3$; equivalently, $d_{35} \geq p_3$.

Temporal relations can be represented by a network $N^+$= $(V,E)^{[1]}$: node $j \Leftrightarrow$ task j, arc $\delta_{ij} \Leftrightarrow$ temporal constraints $d_{ij} \geq \delta_{ij}$.

If the project has a due date d, then $S_{J+1} \leq S_0 + d \Leftrightarrow d_{J+1,0} \geq -d$.

The project has a resource set K with K resources $\{0, \ldots, K-1\}$.

Each renewable resource has a constant limit $R_k$.

If availability of a resource varies over time, that resource may be converted to a fixed resource by introducing some schedule-fixed dummy tasks.

Each task j consumes $r_{jk}$ units of resource k during its execution.

If a task requires a variable amount of resources over time, the task can be divided into subtasks and extra temporal constraints can be imposed to bind them.

$r_{0,k} = r_{J+1,k} = 0$, for all resources k.

Time can be either continuous or discrete (e.g., hour or day).

Time windows are important in project scheduling: $ES_j$, $LS_j$, $p_j$ are earliest start, latest start and duration for task i.

While $p_j$ is given in planning, $ES_j$, $LS_j$ can be obtained by running an all-pair longest path algorithm on $N^+$.

An integer programming formulation will now be set forth for the defined problem. First introduce $x_{jt}=1$ if the task j starts at time t, or $x_{jt}=0$ otherwise.

$$\min \sum_{k \in K} c_k \max_t \sum_{j=1}^{J} r_{jk} \sum_{b=t-p_j+1}^{t} x_{jb} \text{(resource usage level)}$$

$$s.t. \sum_{t=ES_j}^{LS_j} x_{jt} = 1, \forall j \in V \setminus \{0\}, x_{00} = 1$$

-continued $$\sum_{t=ES_j}^{LS_j} t \cdot x_{jt} \geq \sum_{t=ES_i}^{LS_i} t \cdot x_{it} + \delta_{ij}, \forall i, j \in V$$

$$\sum_{j=1}^{J} r_{jk} \sum_{b=t-p_j+1}^{LS_j} x_{jb} \leq R_k, \forall k \in K, t \in \{0, \ldots, d-1\}$$

$$x_{jt} = \{0, 1\}, \forall j \in V \setminus \{0\}, t \in \{ES_j, \ldots, LS_j\}$$

Task start times are determined by solution x:

$$S_j = \sum_{t=1}^{d-1} t x_{jt}$$

for all tasks j.

The scheduling problem, as formulated above, is then solved. The methods that may be used are categorized into exact algorithms, which return optimal solutions, and approximate algorithms, which return optimal or near-optimal solutions. Just as with the conflicts among resources, time, and costs in scheduling, there are tradeoffs among running times, memory usage, and optimality in the choice of algorithms. Since typical turbine service event scheduling problems range from small to middle sizes (i.e., it is not necessary to schedule millions of events), the inventors have chosen to develop and optimize an exact algorithm based on branch-and-bound search techniques.

As noted, both exact algorithms and approximation algorithms are available for solving a computational problem such as that presented by scheduling a gas turbine maintenance project. Approximation algorithms are also known as heuristics. Some common approximation algorithms for combinatorial programming include genetic algorithms, simulated annealing and the Tabu search. Heuristics are fast but they cannot guarantee giving the optimal solutions. Turbine maintenance event scheduling is not a large-scale problem; therefore, approximate algorithms are not good choices.

On the other hand, exact algorithms utilize exact integer programming methods. One example is the branch and bound algorithm, in which an enumeration tree is searched based on available upper and lower bounds. Another example is the branch and cut algorithm, wherein a relaxed problem is solved and new constraints are then generated to separate the infeasible solution of the relaxed problem. A branch and price (column generation) algorithm has also been used for large-scale problems.

Generating efficient and tight bounds is critical to the success of applying the branch-and-bound application to specific problems. Upper and lower bounds are found on sub feasible regions of integer programs. Infeasibility is detected based on a so-far-resource-feasible partial schedule. The upper and lower bounds of scheduling quality measure are found, given a so-far-resource-feasible partial schedule.

For the resource-constrained project scheduling that is the subject of this specification, the branch-and-bound algorithm is refined as follows. A branching strategy includes successively scheduling tasks, but scheduling the tasks only at a limited number of decision times. That dramatically reduces the size of branching tree. Different objectives of the project lead to different decision times.

In developing a search strategy for the algorithm, a key consideration is that a solution includes the start times of all tasks, and hence, solutions are leaves in the enumeration tree. Several possibilities were considered for searching strategies: breadth-first search is too late to obtain the first feasible solution; a depth-first search is too late to search new branches of the branching tree. A scatter search balances breadth-first and depth-first searches, and is used by the inventors in the solution.

Lower bounds must be developed for use both in branching and in candidate (search direction) ordering. Upper bounds are used to detect feasibility of a partial schedule, which may be intractable. The upper bounds are further used to relax or disregard hard resource constraints.

Figure 7:
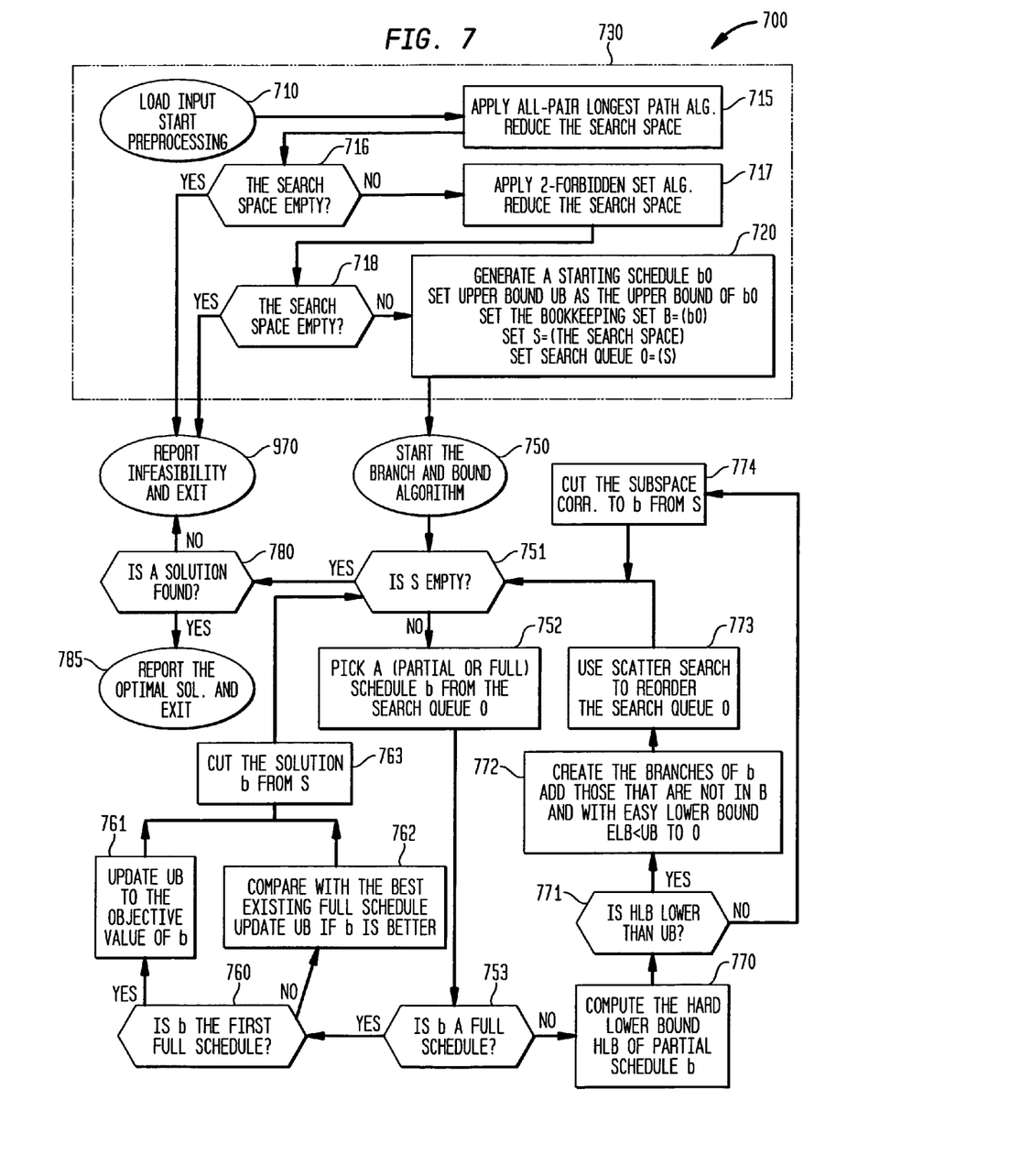
FIG. 7 is a flow chart showing a method according to the invention.

A branch and bound technique 700 according to the invention is shown in FIG. 7 in the form of a flow diagram. Initially, a loading and preprocessing procedure 730 is performed on the project data. An input is initially loaded (step 710). An all-pair longest path algorithm is then applied (step 715) to reduce the search space. The method then checks whether the search space is empty (decision 716) and, if so, the method is terminated (step 790) and the infeasibility of the project is reported.

The all-pair longest path algorithm, which is a simple modification to the well-known all-pair shortest path algorithm, calculates the longest distances between all pairs of nodes in the activity-on-node network. Those longest distances are used to increase the given minimum delay from any activity to succeeding activities. That reduces the number of possible start times and, thus, tightens the search space.

If the search space is not empty, a 2-forbidden task pair (or 2-forbidden set) algorithm is applied (step 717) to further reduce the search space. Again, a determination is made (decision 718) whether the search space is empty, and, if so, the method is terminated (step 790) and the infeasibility of the project is reported.

The 2-forbidden task pair algorithm is a known algorithm that identifies pairs of tasks that cannot execute at the same time due to conflicting resource needs. For certain identified pairs of tasks, the algorithm derives a formative relation that one must execute after the other. That eliminates, from the search space S, the schedules in which these identified pairs of tasks execute at the same time.

As discussed below, a number of infeasible start times are eliminated at steps 715, 717 using algorithms found by the inventors to be effective in this environment.

If the search space is not empty, a remaining group of preprocessing tasks are completed (step 720), including generating a starting schedule b0, setting an upper bound UB as the upper bound of b0, setting a bookkeeping set B={b0}, setting S={the search space}, and setting a search queue O={S}. Loading and preprocessing 730 are then complete, and the method proceeds (step 750) to the branch and bound steps.

A determination (decision 751) is made whether the search space S is empty, and, if so, a determination (decision 780) is made whether a solution has been found. If no solution is found, then the method is terminated (step 790) and the infeasibility of a solution is reported. If a solution is found, then the method is terminated (step 785) and the optimal solution is reported.

If the search space S is not empty, then a partial or full schedule b is picked (step 752) from the search queue O. If b is a full schedule (decision 753), and b is the first full schedule (decision 760), then the upper bound (UB) is updated (step 761) to the objective value of b. If b is a full schedule (decision 753), and b is NOT the first full schedule (decision 760), then b is compared with the best existing full schedule, and the UB is updated if b is better.

In either case (steps 761 or 762), the solution b is cut (step 763) from S and the method returns to check if the search space S is empty (decision 751).

Returning to decision 753, if b is NOT a full schedule, then a hard lower bound (HLB) of the partial schedule b is computed (step 770). The HLB may comprise the computation of hot-start all-pair longest path and/or 2-forbidden task pairs updates. Those techniques are effective because certain tasks in the partial schedule now have fixed start times. That affects the start times of unscheduled tasks. Therefore, the all-pair longest path update and 2-forbidden set update algorithms are likely to further reduce the search space. Furthermore, they are computationally cheap, in part because the update algorithms need not repeat the computations already made in previous iterations of those algorithms.

If the computed HLB is lower than the current UB (decision 711), then the branches of b are created, and those branches that are not in B and have an easy lower bound ELB<UB are added to O (step 772). A scatter search is then used (step 773) to reorder the search queue O and the method returns to check if S is empty (decision 751).

If HLB is NOT lower than UB (decision 771), then the subspace corresponding to b is cut (step 774) from S and the method returns to check if S is empty (decision 751).

While the number of events in a turbine maintenance event scheduling problem is typically limited, the resource consumption is large and diversified. That leads to many resource conflicts between events. By using the all-pair longest path algorithm and the 2-forbidden task pair algorithm, the inventors have made special improvements to the branch and bound technique, for use with turbine maintenance event scheduling and other similar problems having a small to medium number of tasks and high-cost, shared resources. Those improvements have been implemented by the inventors in C++ code.

The inventors have used an all-pair longest path algorithm (step 715) in preprocessing to tighten the set of possible start times of the tasks. The set of possible start times of the tasks is further tightened by considering 2-forbidden task pairs (step 717). 2-forbidden task pairs means the pairs of tasks that cannot execute at the same time due to conflicting resource needs.

The project scheduling problem is a discrete global optimization problem. The branch and bound algorithms are based upon partition, sampling, and subsequent lower and upper bounding procedures: those operations are applied iteratively to the collection of active ("candidate") subsets within the solution space. Branch and bound subsumes many specific approaches, and allows for a variety of implementations. Branch and bound methods typically rely on some a priori structural knowledge about the problem. The general branch and bound methodology is applicable to broad classes of global optimization problems; e.g., in combinatorial optimization, concave minimization, reverse convex programs, DC programming, and Lipschitz optimization.

In a project scheduling problem with n tasks and due in T units of time, the whole solution space is the set of all n-element vectors with elements having their values between 0 and T. Each such vector represents a combination of the start times of the n tasks; i.e., a schedule. A branch is a solution sub-space containing the n-element vectors wherein one or more elements are fixed. For example, the set of the vectors of the form (1, ?, ?, ?, ..., ?), where the ?s represent unknowns, forms the branch containing all the schedules in which task #1 starts at time 1. Clearly, the set of the vectors of the form (1, 4, ?, ?, ..., ?) forms a (sub)branch of the previous branch. A branch corresponds to a partial schedule.

Each branch contains many vectors (corresponding to full schedules). The quality of such schedules is measured by the values of the objective function (e.g., total resource procurement cost). The lower the value is, the better the quality is. Since the only interest is in finding a feasible schedule with the best quality, there is no need to further partition and check up a branch IF the value lower bound of all the schedules in the branch is HIGHER than an existing (known) value upper bound of the globally best feasible schedule.

For example, if there exists a feasible schedule with objective value equal to 10, then it is known that the globally best feasible schedule has an objective value NO MORE than 10. Assuming the lower bound calculation of a branch gives 11, then there is no need to further investigate the branch because the globally best feasible schedule is definitely not contained in this branch.

It is clear from the above example that the tightness (i.e., the closeness to the exact value) of the lower bound and the upper bound directly determines the efficiency of a brand and bound algorithm. The tighter the bounds are, the faster the branch and bound algorithm. The worst example is that a lower bound algorithm and an upper bound algorithm always return zero and infinity, respectively, so that no branches will be excluded from the search. In that case the branch and bound algorithm is reduced to a plain search.

Besides the bound tightness, the search strategy and the bookkeeping method also affect the efficiency. The search strategy governs the order of search in the active solution space (i.e., the space containing the branches that are not excluded). The bookkeeping records the search branches together with their lower and upper bounds to avoid revisiting.

The most important component in a branch and bound algorithm is the lower and upper bound estimation. The lower and upper bounds of a partial schedule form an interval of total resource procurement cost which contains the cost of the BEST full schedule that conforms with the partial schedule.

Given a partial schedule, a hard lower bound (HLB) is determined in the method of the invention as follows: The method first calculates the resource procurement cost incurred by the scheduled tasks, which have fixed start times. Then, the all-pair shortest path and the 2-forbidden task pair algorithms are used to tighten the intervals of the possible start times of the unscheduled tasks. It is noted that two algorithms have low computational costs. The next step is to derive, for each unscheduled task, its non-floating time period, during which the task must be undergone. For example, a task with duration 5 and the start time interval [2 4] has a non-floating period from 4 to 7. Whether or not this task is undergone at a time between 2 and 4 or between 7 and 9 depends on the task's actual start time. The set of those times is defined as the floating period, as opposed to the non-floating period. The floating or non-floating periods of a task, but not both, can be empty. Certain resources are necessarily occupied by a task during its non-floating period.

On the other hand, the resource utilization by a task during its floating period is not completely determined; we only know the total, as well as the limit of the per-period, resource utilization of the task during its floating period. The HLB algorithm tries to distribute those remaining resource usages of all the unscheduled tasks to their floating periods such that the sum of total resource procurement cost is minimized. Since the resource assignment in this fashion may not match the nonpreemptiveness (a.k.a., uninterruptibility) of some unscheduled tasks, the HLB algorithm gives a lower bound.

The ELB (easy lower bound) algorithm only does a part of the jobs in the HLB algorithm, and therefore has a faster computation time. The ELB is primarily used to determine the priorities of search candidates and to act as a helper to Scatter Search, which is a less essential task in the branch and bound algorithm.

The upper bound algorithm works in a similar way as the HLB algorithm. It differs the HLB algorithm by the fact that it over-estimates the resource utilization by assuming the unscheduled tasks are undergone in both their floating and non-floating periods. If the problem-specified resource limits are not violated by the over-resource allocation, a finite upper bound is obtained. This algorithm makes it possible to know an upper bound before a full schedule is examined.

While the easy lower bound ELB is implemented as a simple, so fast, function, all-pair longest path update and 2-forbidden task pair update are used to give the hard lower bound HLB (step 770). That strategy reduces processing time because all-pair longest path update uses the information of the previous partial schedule, so does NOT need to recalculate all-pair longest path. Therefore, HLB, though slower than ELB, is still faster than searching a branch.

Numerical results based on simulated event and resource data have shown that HLB helps cut a large portion of branches in search space S. That saves a lot of running time in doing the search. Optimal schedules are therefore returned by the code in short running times.

Genetic Algorithm-Based Technique

In addition to the above exact branch and bound technique, the inventors have also used a genetic algorithm-based approach for solving scheduling problems such as the gas turbine maintenance problem. The genetic algorithm-based method is an approximate algorithm and therefore is much quicker than the branch and bound technique described above, but without guaranteed optimum results.

Problem Modeling

The following discussion uses the notation given in Table 1. It is noted that the notation is divided into the project part and the network part. In the model, the precedence/temporal constraints and the event times are represented using the event-on-node network. For efficiency, a large portion of the computation is done on the network.

TABLE 1

| Project | |
|---|---|
| $\mathcal{J} := \{1, \ldots, J\}$ | the set of activities |
| $J := |\mathcal{J}|$ | number of real activities |
| $0, 2J + 1$ | the indices of dummy project start and dummy project finish events |
| $T_{2j-1}, T_{2j}$ for $j \in \mathcal{J}$ | the start and finish times of activity j (the events indexed by 2j − 1 and 2j) |
| $T_0 = 0, T_{2J+1}$ | the project start and finish times |
| $\mathcal{M}_j$ | the set of possible execution modes of activity j ($|\mathcal{M}_j| \leq C$ uniformly) |
| $m_i (\in \mathcal{M}_i)$ | execution mode of activity i |
| $\mathcal{D}_j$ | set of possible durations of activity i |
| $p_j$ or $p_{j,m_j}$ | duration of activity i |
| $d_{max}$ | maximum project duration |
| Network | |
| EoN network (V,E) | event-on-node network |
| node $i \in E$ | event i (either a start or a finish event) |
| | 0 - project start event |
| | i (odd) - start event of activity (i + 1)/2 |
| | i (even) - finish event of activity i/2 |
| | 2J + 1 - project finish event |
| $w_{ij}$ | signed weight (length) of arc (i, j) |
| | $w_{ii} = 0$ for all $i \in E$ |
| | $w_{0i} \geq 0$ for all $i \in E$ |
| | $w_{i,2J+1} \geq 0$ for all $i \in E$ |
| | $w_{2J+1,0} = -d_{max}$ for all $i \in E$ |

TABLE 1-continued

| | |
|---|---|
| $T_i$ | happening time of event i |
| $d_{ij}$ | longest path length from nodes i to j (= the min delay from events i to j) |

The techniques of the invention are developed below in the following detailed setting and definitions:

A set of non-preemptive activities in J={1, ..., J}, where each of the starts and finishes of the real activities is called an event. Also included are a dummy start activity and a dummy finish activity.

The project start, project finish and the starts and finishes of all activities are called events. The events are indexed in the way shown in Table 1.

The start times $T_{2j-1}$ and finish times $T_{2j}$, for j ∈ J and j≠0, 2J+1, are decision variables (but $ST_0 \equiv 0$ and $T_{2j+} \equiv \max_{j=1,...,J} T_{2j}$).

The project has a given due date $d_{max}$, which incurs constraint $T_{2J+1} \leq d_{max}$.

A set of prescribed temporal rules is represented on an event-on-node (EoN) network (V, E): if event j should happen at least $w_{ij}$ long in time after event i happens, then it is said that arc (i,j) is in E with weight $w_{ij}$; i.e., $w_{ij} \equiv t \rightarrow T_j \geq T_i + t$; $w_{ij}$ is also called prescribed minimal delay between events i and j.

If two events i and j have fixed delay t, then $w_{ij} = t$ and $w_{ji} = -t$.

In the EoN network (V, E), V contains the real events together with the dummy start and the dummy finish events, and E contains the following six edges:

1. (i, j) with $w_{ij}$ representing the problem-specified minimum delay between the real events i and j.
2. (0, i) with $w_{0i} = 0$ representing the minimum delay 0 between the project start and real event i.
3. (i, J+1) with $w_{i, 2J+1} = 0$ representing the minimum delay 0 between real event i and the project finish.
4. (2J+1, 0) with $w_{2j+1, 0} = d_{max}$ representing the maximum delay (i.e., the maximum project duration) $d_{max}$ between the project start and finish.
5. For the activity j ∈ J, the expression $w_{2j-1, 2j} = \min P_j$ represents the minimum delay between the start and the finish of activity j, which is the minimum duration of activity j.
6. For the activity j ∈J, the expression $w_{2j-1} = -\max P_j$ represents the maximum delay between the start and finish of activity j, which is negative to the maximum duration of activity j.

A set of renewable resources with limited and fixed availabilities is required by the activity executions. That is a typical condition in a project scheduling problem.

Nonrenewable resources with limited total stock are also considered. Renewable energy is not considered.

Activities may have more than one execution mode, each associated with a duration, a payoff, and resource usages. For example, some possible configurations are:

1. A single-mode configuration, wherein each activity has only one prescribed execute mode (e.g., $P_j=\{3\}$, activity j has duration 3).
2. A multi-mode configuration wherein modes are continuous (e.g., feasible durations are between given a normal one and a crash one $P_j=[1,9]$, activity j can have any duration between 1 and 9).
3. A multi-mode configuration wherein modes are discrete (e.g., $P_j=\{1, 3, 9\}$, activity j can have duration 1, 3, or 9).

The objective is to minimize the cost and profit incurred from, but not limited to, project fulfillment, renewable resource purchase and usage, nonrenewable resource usage, other mode-dependent activities.

The above-described problem is referred to herein as GTCRCPSP (generalized time/cost resource-constrained project scheduling problem), wherein the term "generalized" means that the usual makespan objective function, which is "regular," is replaced by a general measure of cost/performance, which is not necessarily "regular."

Solution Coding

Solution coding, i.e., a way of completely or partially representing a solution, is highly related to the problem structure. All ways of coding are categorized into two classes: the direct representations, in which solutions themselves are directly, uniquely and completely encoded, and the indirect presentations, in which the partial structural information of solutions are coded. Hence, solutions are not uniquely and completely encoded. In approaching the present problem, the inventors have utilized the an indirect presentation.

Sequencing the activities works for most project scheduling problem with "regular" objective functions. In project scheduling with limited resources, sequencing is typically used to order the priorities of all activities in acquiring rare resources. That model has been proved to have excellent performance; however, the generation of activity schedules from a priority order of activities requires the "regular" property, so that technique does not work with "non-regular" objectives.

The inventors have instead used an approach whereby the events of all activities are ordered or permuted. Here, the events include the start events and the finish events. We do not specify the occurrence time of the events at this stage, although it is the goal of the problem. Instead, only the order of events is specified. In the second stage, the models are easily and quickly solved to generate the optimal schedule from an event order.

The event order is an indirect representation of solutions. It has the following advantages. First, this representation is enough to determine the feasibility of solution with respect to resource constraints and the resource usage levels along the time. Since resource consumption and sharing depend on activities and their sequences only, the resource expense and the existence of any violation to resource constraints can be determined by only examining the order of the events. Second, setup time and costs may also be easily determined based upon that representation.

Third, given that representation, fast algorithms are available for solving for optimal staring/finishing times of activities for many scheduling problems with different constraints and objectives in addition to the resource constraints and/or the resource leveling objective. The event order represents the combinatorial (hence hard) part in many project scheduling problems while leaving the continuous (hence easy) part to fast algorithms. It is noted that the feasibility problem of the resource-constrained project scheduling problem is already NP-complete and the problem of finding an optimal solution with minimal makespan is strongly NP hard. However, resource constraints play no role in the problem of fixing an event order; therefore, solving for the event times complying with the event order could be done in polynomial times for many types of problems. It is further noted that for the discrete multi-mode problem, the execution modes of activities are included in the representation since multi-mode itself makes the problem NP-hard.

Coding Uniqueness

In nearly all known algorithms that search for the best combinatorial solutions, the uniqueness of the solution coding promotes computation efficiency. The solution coding is said to be unique if each solution has only one indirect representation (although a representation can represent more than one solution). When coding is non-unique, algorithms may produce effectively the same solution by searching more than one representation. The technique of the invention insures that the proposed solution coding is unique except for certain degenerated cases, which are rare.

The inventors have pursued coding uniqueness in different ways for each of three forms of time-based constraints: (1) precedence constraints, which specify whether the entire execution of an activity is before or after another; (2) starting/finishing time-based constraints, which specify whether the starting and/or the finishing times of an activity are before or equal to, or after or equal to, those of another activity; and (3) temporal constraints, which extend starting/finishing time constraints by introducing time intervals (e.g., $T_j \leq T_i + 3$ hours means that event j cannot take place at any time earlier than 3 hours after event i takes place).

When the durations of activities are fixed, temporal constraints can be fully expressed either in the starting times or in the finishing times. For each of the forms, we derived certain rules of grouping elements in an event order; i.e., omitting the orders of certain consecutive elements in the order. That ensures that the solution coding is unique unless degeneracy happens. We note that degeneracy can be prevented by slightly perturbing the data.

Pruned Hypercube

This discussion will now address finding a feasible and optimal event order. An event order is feasible if there exists at least one feasible solution in which the times of events honor that order. A feasible event order is optimal if there exists at least one feasible and optimal solution in which the times of events honor this order. With those definitions, many general techniques for finding optimal combinatorial solutions can be used to find a feasible and optimal event order. Those general techniques include, but not limited to, the genetic algorithm, the branch-and-bound method, the branch-and-cut method, etc. To use any of those techniques, event "orders," which are logic, should be mapped to "numbers," which are computational.

The pruned unit hypercube is now introduced to represent the set of event orders. An m-element order $p$ ($p_1, p_2, \ldots, p_m$) is associated with the following part of the unit hypercube: $H^p = \{x \in [0,1]^m : x_{p_1} \leq x_{p_2} \leq \ldots \leq x_{p_m}\}$. Any one point in $H^p$ may be used to represent order p. Using that mapping it is also possible to represent the precedence constraints by the linear cuts that prune the unit hypercube. To summarize, the pruned unit hypercube is introduced to efficiently represent event orders and precedence constraints. That representation essentially enables the use of many general-purpose techniques to find the feasible and optimal event order.

The following is an example to illustrate how the pruned hypercube may be used to generate the initial population (i.e., a set of initial feasible event orders) in a genetic algorithm. In order to generate initial event orders uniformly (i.e., all feasible event orders having the same probability of being chosen), the use of hit-and-run random walk in a pruned unit hypercube is introduced. For the total 2J real events, a unit hypercube is generated in $R^{2J}$, which is denoted by $H := \{x \in R^{2J}: 0 \leq x \leq e\}$. Then, for every pair-wise precedence relation (either existing or induced by temporal constraints), say event i must happen before event j, the half space $x_i \leq x_j$ is introduced to H. After all half spaces are introduced, the result is the pruned unit hypercube $H^w := \{x \in H : x_i \leq x_j$ if $w_{ij} \geq 0\}$. Let $\Pi_n$ denote the set of all permutations of numbers $1, \ldots, n$ and let $\Pi_{2J}^w$ denote the subset of $\Pi_{2J}$ in which all permutations satisfy the pair-wise precedence relations induced by $w_{ij}$ for any i≠j; i.e., if $\pi \in \Pi_{2J}^w$, and $w_{ij} \geq 0$ then $\pi(i) < \pi(j)$ (i is before j in $\pi$). It is noted that, in the case of $w_{ij} = w_{ji} = 0$, the events i and j are consolidated into a single event. Therefore, for a network with no positive cycle, any $\pi \in \Pi_{2J}^w$ is feasible with respect to the precedence relations.

Define $F : H \to 2^{\Pi_{2J}}$ as the set-valued function that maps $x \in H$ to $F(x) := \{\pi : x_{\pi(i)} \leq x_{\pi(j)}$ if $i < j\}$. In other words, F(x) contains the permutations that comply with the increasing orders $x_1, \ldots, x_{2J}$. The following proposition is thereby proved, which states that if a point x is uniformly sampled in $H^w$ then we get the corresponding $\pi$ uniformly in $\Pi_{2J}^w$:

Proposition: Let m(·) denote the Lesbegue measure defined on the subsets in the Euclidean space $R^{2J}$.

1. $m(\{x \in H^w : |F(x)| > 1\})$ equals 0; i.e., the set of x's where F is multi-valued has zero Lesbegue measure.
2. $m(\{x \in H^w : \pi \in F(x)\})$ equals 0 for any $\pi \notin \Pi_{2J}^w$ and equals $m(H^w)/|\Pi_{2J}^w|$ for any $\pi \in \Pi_{2J}^w$.

It is believed that no existing models using genetic algorithms to solve the project scheduling problems have that property. Based on the proposed solution coding and the use of pruned hypercube, most existing combinatorial optimization techniques can be used to find the optimal (or nearly optimal) event order with little adaptation work.

The Event-On-Node Network

The problem-prescribed temporal/precedence constraints are a set of inequalities in the form of $T_j \geq T_i + w_{ij}$ where i and j are two real or dummy events. Those constraints represent the time-feasible polyhedron in time space $R^{2J}$ of the real events. An event order is a sequence of real events that specifies more constraints in the same form. Therefore, a chromosome may be viewed as a sub-polyhedron contained in TP and TP is divided into the sub-polyhedron defined by all the chromosomes.

The temporal/precedence constraints and event times on the EoN (event-on-node) network are now presented. A directed path, which comprises one or more forward arcs in the form $(i_1 \to \ldots \to i_k \to j)$, in an EoN network from node i to node j with length w, indices a lower bound on $d_{ij}$, the longest path length from i to j. If w>0, then it is a lower bound on the minimum delay between events i and j since event j must happen after i and all the events on the path happen and the length of the arcs in this path give the minimal delay between the connected events.

Suppose there are K different paths with lengths $w_k$, $k=1, \ldots, K$, connecting event i to event j, then $d_{ij}$, the minimal delay between i and j, is equal to the maximum of $w^k$.

A directed cycle in the EoN network is a directed path starting from i and ending on the same node i. If a cycle has length w>0, then we have $T_i \geq T_i + w$. That means that there is no feasible time for event i to happen. In fact, all the events in the cycle do not have feasible time. If a cycle in the form $(i_0 \to i_1 \to \ldots \to i_k \to i_0)$ has length w=0 (i.e., null cycle), we have $$T_{i_0} \geq T_{i_k} + w_{i_k, i_0} \geq \ldots \geq T_{i_0} + \underbrace{w_{i_k, i_0} + \sum_{j=0}^{k-1} w_{i_j, i_{j+1}}}_{=w} \geq T_{i_0} + 0.$$

Clearly, all inequalities hold with equalities. Therefore, the time of any one event determines the times of all the others.

Time-feasibility is defined herein as follows: a schedule $\{T_0, T_1, \ldots, T_{2J}, T_{2J+1}\}$ is time-feasible if $T_0 = 0$ and all prescribed temporal constraints are satisfied; that is, $T_j \geq T_i + w_{ij}$ holds for any $(i, j) \in E$.

Next, the properties based on the EoN network are discussed under three cases: single-mode, multiple mode with continuous durations (i.e., all possible durations form an interval), and multiple mode with discrete durations. In the single-mode case, each activity has fixed duration p and fixed resource utilization during its execution. In the multiple cases, some or all activities may have different execution modes, each of which fixes a duration and resource utilization. Multi-mode with continuous durations means the prescribed possible durations of activity j, for $\forall_j \in J$, form a time interval $\lfloor p_j^{min}, p_j^{max} \rfloor$; multi-mode with continuous durations means the prescribed possible durations of activity j, for some $j \in J$, form a discrete set $P_j := \{p_{j1}, \ldots, p_{j|M_j|}\}$ where $|M_j|$ denotes the total number of activity j's modes. It is assumed that activities cannot switch modes during execution.

In the single-mode case, for each activity j, let $w_{2j-1, 2j} = p_j$ and $w_{2j, 2j-1} = -p_j$. The cycle $2j-1 \rightarrow 2j \rightarrow 2j-1$ is a null cycle. Clearly, $T_{2j-1} + p_j = T_{2j}$. Nodes 2j-1 and 2j, which represent the start and finish of activity j, may therefore be consolidated into one node 2j-1 by keeping all the arcs coming in and going out 2j-1 with their length unchanged; and keeping all the arcs coming in and going out 2j connected to the new node and adding $p_j$ to their length. After all real activity events are consolidated, the AoN (activity-on-node) network is formed. Therefore, the following result of the AoN network is inherited:

Theorem: There is a time-feasible schedule for a single-mode project if and only if the corresponding AoN network does not contain any positive cycle.

In the case of a multi-mode network with continuous durations, for each activity j, we let $w_{2j-1, 2j} = p_j^{min}$ and let $w_{2j, 2j-1} = -p_j^{max}$. A result similar to the above theorem is proved:

Theorem: There is a time-feasible schedule for a multi-mode project with continuous durations if and only if the corresponding EoN network does not contain any positive cycle.

Figure 2:
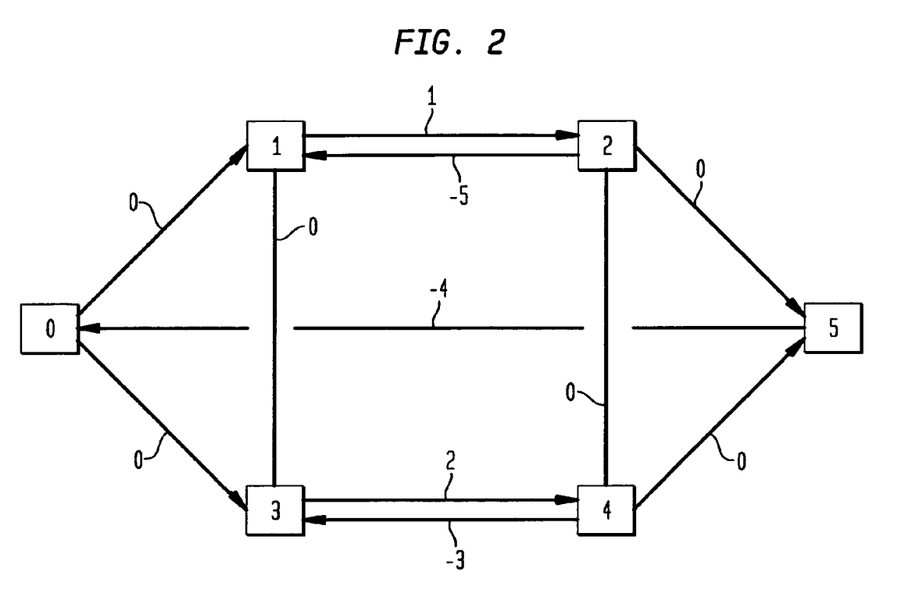
FIG. 2 is an example scheduling network.

In the multi-mode case with discrete durations, for each activity j, we let $w_{2j-1, 2j} = \min P_j$ and $w_{2j, 2j-1} = -\max P_j$. Unfortunately, the result is not similar to the above theorems simply because $\min P_j$ and $\max P_j$ do not give all the information of the set of the feasible durations, which is discrete. Referring to FIG. 2, suppose $P_1 = \{1, 5\}$. The project has no time-feasible schedule since $1 \in [2, 4]$ and $5 \in [2, 4]$, where the interval [2, 4] gives the tightest lower and upper bounds of the feasible durations of activity j. Since determining the optimal modes in a multi-mode problem is a combinatorial problem, the mode choices are included in the solution coding. Put another way, $[w_{12}, -w_{21}]$ does not equal the feasible duration interval [2,4] of activity 1.

Final Solution Generation

Upon having the feasible and optimal event order, fast algorithms may be used to obtain the feasible and optimal solution; i.e., the starting times and the execution modes of the activities that achieve the optimized objective. That is because the resource constraints are satisfied by all solutions conforming the given event order, and the choices of modes are fully determined. In other words, the essentially combinatorial parts of the problem are solved, and only the continuous part is left. The continuous part is the problem to identify a set of feasible starting times that satisfy the given event order and achieve the best time-related objective. The algorithms to solve this problem, which are finally application-dependent, may be linear programs, quadratic programs, and other programs that can be solved efficiently by general solvers.

The genetic algorithm-based scheduling system and method extends the existing project scheduling concepts and techniques by considering more realistic factors, in the form of constraints and objective evaluation, in a single and integrated model. The inventors introduce a new model to formulate the extended project scheduling problems as 2-stage optimization problems. For the first stage (which is the harder one), the inventors developed new way for solution presentation and mapping, which enable them to use general-purpose techniques to solve for solutions.

CONCLUSION

It is instructive to revisit the seven factors listed earlier, in light of the inventions disclosed herein. The first two factors are the importance of the overall deadline and dominance of resource costs. Those factors are common challenges, and are the typical requirements in a scheduling solution. Both presently described models (branch-and-bound and genetic algorithm-based) determine the starting and finishing times of all activities such that the deadline is met (given by the temporal constraints, and also represented on the EoN network) and the resource expenses are minimized (given by the objective of minimizing resource costs).

The third factor, resource sharing, is rarely considered in the literature or in most existing software; however, it happens very often in the real world. The difficulty lies in the fact that resource sharing exhibits a nonlinear relation between the required amount of resources and the amount of work they serve. In the genetic algorithm-based model, the nonlinear part of resource sharing is determined in optimizing the event orders. Given an event order, it can be determined using that model which resources can be shared by which activities at which order. After fixing an event order, it is a linear problem to determine the length of time for each resource sharing, which is directly given by the event times. Resource sharing is not covered by the above-described branch and bound technique.

The fourth factor concerns multiple execution modes. Activities can be performed in different modes. Each mode of an activity is associated with a profile, which specifies the activity duration, the consumption of resources, quality, and profits. For the discrete multi-mode problem, the genetic algorithm-based model determines a set of execution modes together with an event order in stage 1. However, for the continuous multi-mode problem, that model determines a set of execution modes in stage 2 since the models are directly determined by the event times. The branch and bound technique described above partially covers multiple execution modes.

Sequence-dependent setup time and costs were considered in the fifth factor. That concept was originally associated with single-machine production scheduling; however, the present inventors generalized it and associated it with the concept of personnel traveling and resource transportation. The genetic algorithm-based solution coding of event orders fundamentally enables the sequence-dependent setup time and costs to be easily evaluated and optimized as one of the objectives in stage 1. Sequence-dependent setup time and costs are not considered in the branch and bound model described herein.

The sixth factor related to temporal constraints, and is handled by both the branch and bound model and the genetic algorithm-based model presented herein. The relations between the activities in certain time-sensitive real-world applications must be presented by the temporal constraints, instead of the simpler precedence constraints. The temporal constraints generalize the traditional precedence constraints. In temporal constraints, the minimal and maximum delays between activities are specified. To compute feasible event times, the EoN network was used to represent the temporal constraints and event times. For simple-mode and continuous multi-mode problems, the modes are optimized in stage 2, while for discrete multi-mode problems, the modes are determined optimized together with the event orders in stage 1.

The seventh factor took into consideration that there may be various, conflicting objectives. Most project scheduling models in the literature and most commercial scheduling software only minimize project makespans. In other words, they optimize worst-case task durations. While minimizing makespan is an important purpose of traditional production scheduling, it is not the only one. The type of objective function is directly related to the model design and algorithm selection. A lot of real-world objectives are "non-regular"; i.e., generally speaking, the objective may not be improved by scheduling activities earlier. Those objectives are considered harder than those with regular objectives because the underlying problem lacks the property of monotonicity. Neither presently described model relies on the property of monotonicity to construct solutions. This is why the presently described models can optimize "non-regular" objectives.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. For example, while the technique is described primarily for use in connection with turbine maintenance event scheduling, those skilled in the art will understand that the technique may be used as well in connection with other, similar scheduling problems having a small to medium number of events and large and diversified resource consumption. It is to be understood that the embodiments shown and described herein are only illustrative of the principles of the present invention and that various modifications may be implemented by those skilled in the art without departing from the scope and spirit of the invention.

What is claimed is:

1. A method for scheduling a group of tasks in a turbine maintenance project, the tasks having interrelated temporal constraints and resource requirements, the temporal constraints comprising minimum and maximum delays between tasks, the method comprising the steps of:
    loading information regarding the turbine maintenance project, including the temporal constraints and resource requirements of the tasks, precedence rules on the tasks, resource price models, resource availabilities, and a resource cost objective to measure performance, to create a search space S;
    in a computer processor, preprocessing the search space S, including:
        creating, using the precedence rules on the tasks, an event-on-node network having nodes corresponding to the tasks;
        reducing the search space S using an all-pair longest path technique, including calculating a longest path $d_{ij}$ between each pair of nodes i, j in the event-on-node network considering the temporal constraints of the tasks, and removing from the search space S all schedules including a delay less than $d_{ij}$ between nodes i and j;
        reducing the search space S using a 2-forbidden task pair technique, including identifying, based on the resource requirements and the resource availabilities, conflicting pairs of tasks that cannot execute simultaneously because the resource availabilities are exceeded, and removing from the search space S all schedules containing simultaneous execution of the conflicting pairs of tasks; and
        picking an upper bound UB of the search space S;
    in a computer processor, applying a branch and bound technique to the preprocessed search space S to find an optimal schedule, including:
        picking a partial schedule b from the search space S;
        computing a hard lower bound HLB of the partial schedule b to evaluate the resource cost objective, including
            using the resource price models, calculating resource procurement costs incurred by tasks in b;
            using all-pair shortest path technique to tighten intervals of possible start times of unscheduled tasks in b;
            deriving non-floating time periods during which each unscheduled task in b must be undergone; and
            minimizing a total resource procurement cost of all tasks in b by adjusting start times of the unscheduled tasks in b to distribute the resource procurement costs that are incurred outside the non-floating time periods; and
        removing the partial schedule b from the search space S if the HLB is greater than the UB; and
    scheduling the tasks according to the optimal schedule.

2. The method of claim 1, further comprising the step of picking an upper bound UB of the search space S; and wherein the branch and bound technique includes the steps of:
    picking a partial schedule b from the search space S;
    computing a hard lower bound HLB of the partial schedule b using a 2-forbidden task pair update; and
    comparing the HLB with the UB.

3. The method of claim 1, wherein the preprocessing step further includes the steps of:
    generating a start schedule;
    setting an upper bound of the start schedule;
    setting a bookkeeping set from the starting schedule; and
    setting a search queue.

4. The method of claim 3, wherein the branch and bound technique further includes the step of:
    conducting a scatter search in the search space S to reorder the search queue.

5. The method of claim 1, wherein searching performed in the branch and bound technique comprises performing a scatter search.

6. A computer program product comprising a non-transitory computer readable recording medium having recorded thereon a computer program comprising instructions for, when executed on a computer, instructing said computer to perform a method for scheduling a group of tasks in a turbine maintenance project, the tasks having interrelated temporal constraints and resource requirements, the temporal constraints comprising minimum and maximum delays between tasks, the method comprising the steps of:
    loading information regarding the turbine maintenance project, including the temporal constraints and resource requirements of the tasks, precedence rules on the tasks, resource price models, resource availabilities, and a resource cost objective to measure performance, to create a search space S;
    preprocessing the search space S, including:
        creating, using the precedence rules on the tasks, an event-on-node network having nodes corresponding to the tasks;
        reducing the search space S using an all-pair longest path technique, including calculating a longest path $d_{ij}$ between each pair of nodes i, j in the event-on-node network considering the temporal constraints of the tasks, and removing from the search space S all schedules including a delay less than $d_{ij}$ between nodes i and j;

reducing the search space S using a 2-forbidden task pair technique, including identifying, based on the resource requirements and the resource availabilities, conflicting pairs of tasks that cannot execute simultaneously because the resource availabilities are exceeded, and removing from the search space S all schedules containing simultaneous execution of the conflicting pairs of tasks; and picking an upper bound UB of the search space S;

applying a branch and bound technique to the preprocessed search space S to find an optimal schedule, including:

picking a partial schedule b from the search space S;

computing a hard lower bound HLB of the partial schedule b to evaluate the resource cost objective, including using the resource price models, calculating resource procurement costs incurred by tasks in b;

using all-pair shortest path technique to tighten intervals of possible start times of unscheduled tasks in b;

deriving non-floating time periods during which each unscheduled task in b must be undergone; and minimizing a total resource procurement cost of all tasks in b by adjusting start times of the unscheduled tasks in b to distribute the resource procurement costs that are incurred outside the non-floating time periods; and removing the partial schedule b from the search space S if the HLB is greater than the UB; and scheduling the tasks according to the optimal schedule.

7. The computer program product of claim 6, wherein the method further comprises the step of picking an upper bound UB of the search space S; and wherein the branch and bound technique includes the steps of:

picking a partial schedule b from the search space S;

computing a hard lower bound HLB of the partial schedule b using a 2-forbidden task pair update; and comparing the HLB with the UB.

8. The computer program product of claim 6, wherein the preprocessing step further includes the steps of:

generating a start schedule;

setting an upper bound of the start schedule;

setting a bookkeeping set from the starting schedule; and setting a search queue.

9. The computer program product of claim 6, wherein the branch and bound technique further includes the step of:

conducting a scatter search in the search space S to reorder the search queue.

10. The computer program product of claim 6, wherein searching performed in the branch and bound technique comprises performing a scatter search.

\* \* \* \* \*